Oct. 31, 1967

R. L. CRAIN ETAL 3,349,789

LUBRICATED WEDGE GATE VALVE

Filed May 24, 1965

INVENTORS
ELWOOD K. PIERCE
ROBERT L. CRAIN

BY Cushman, Darby & Cushman
ATTORNEY

Oct. 31, 1967     R. L. CRAIN ET AL     3,349,789
LUBRICATED WEDGE GATE VALVE
Filed May 24, 1965     6 Sheets-Sheet 2

INVENTORS
ELWOOD K. PIERCE
ROBERT L. CRAIN
BY Cushman, Darby & Cushman
ATTORNEYS

Fig. 6.

United States Patent Office 3,349,789
Patented Oct. 31, 1967

3,349,789
LUBRICATED WEDGE GATE VALVE
Robert L. Crain and Elwood K. Pierce, Jr., Houston, Tex., assignors to Gray Tool Company, Houston, Tex., a corporation of Texas
Filed May 24, 1965, Ser. No. 458,190
18 Claims. (Cl. 137—246.22)

The present invention relates to valves and more particularly to gate valves having wedging means for sealing the gate to the valve seats in the closed position of the valve.

An object of the invention according to one embodiment thereof is the provision of a gate valve of the type described wherein the valve includes a bonnet and the gate and wedge means are withdrawable from the valve with the bonnet for repair and renewal of parts.

A further object of the invention is the provision of a wedge-type gate valve wherein the valve forms a seal on either side of the gate so that the valve need not be oriented with respect to an upstream side or a downstream side.

It is another object of the present invention to provide a wedge type gate valve wherein the wedge means acts upon the gate only during the closing action of the valve and does not materially restrict releasing of the valve.

Another object of the invention is the provision of a valve of the type described wherein the valve seats are renewable without removing the valve from the line in which it is interposed.

Yet another object of the invention is the provision in a valve of the type described wherein all gauging and machining can be done with the bonnet contact surface as a reference point along the center line of the valve.

Further objects of the invention are the provision in a valve of the type described of anti-corrosion lining material in the flow passage of the valve and of a double tapered conically curved seal between the valve body and bonnet.

These and other objects of the present invention as well as the principles and scope of applicability thereof will become more clearly apparent during the course of the following detailed explanation relating to the preferred embodiments of the invention which are shown in the attached drawings.

Figure 1:
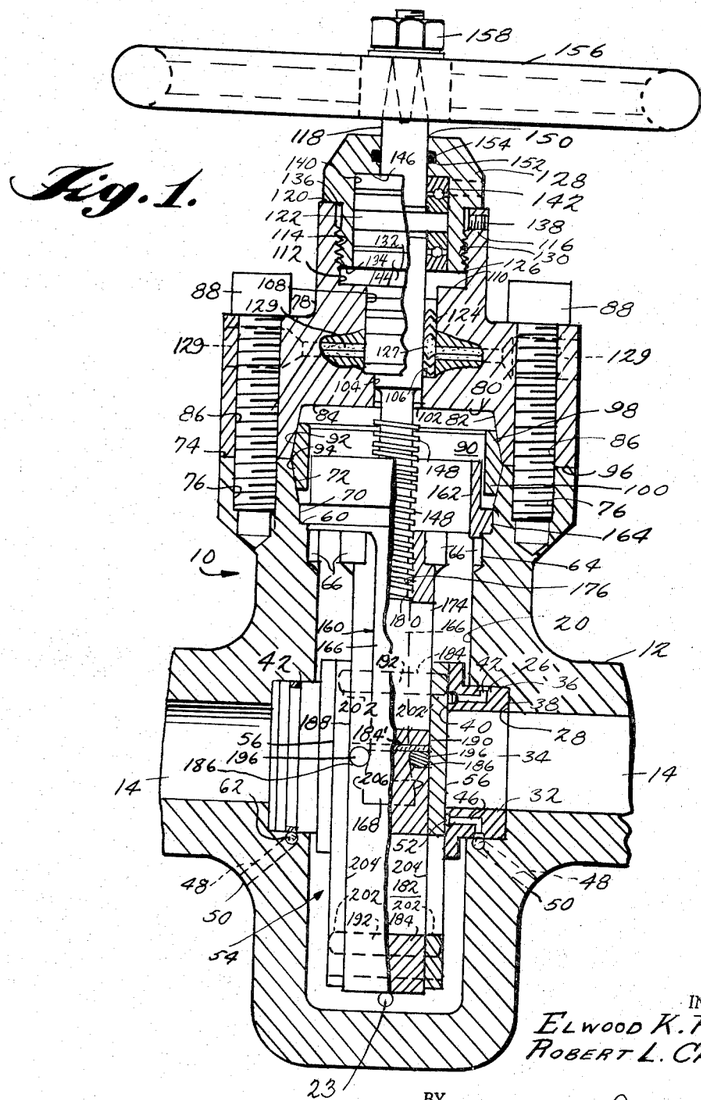
FIGURE 1 is a vertical longitudinal sectional view of a first embodiment of the invention.
Figure 2:
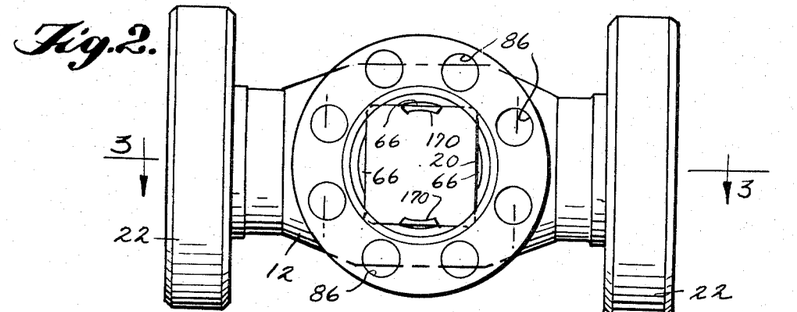
FIGURE 2 is a top plan view of the valve body of the valve shown in FIGURE 1.

The gate valve 10 shown in FIGURES 1-6 includes a body 12 having a longitudinal passageway 14 of generally circular transverse cross-sectional shape which communicates at each extremity 16, 18 with the exterior of the body 12. Intermediate the extremities 16 and 18 the passageway 14 is intersected by an enlarged gate receiving chamber 20. As best seen in FIGURE 2, the chamber 20 is substantially square in horizontal cross-section throughout the majority of its length. Suitable means such as radially outwardly extending bolt receiving annular flanges 22 (FIGURE 3) can be integrally formed with the body adjacent the extremities thereof for securing the valve 10 to conduits or the like as is known in the art. Alternate means of securement such as clamp receiving tapered flanges could be provided instead of bolt receiving flanges 22. A bleeder port is shown provided at 23.

Adjacent and leading to each of the two intersections 24 of the passageway 14 with the gate receiving chamber 20 the passageway 14 is radially enlarged, for instance by coring or counterboring, to form two seat receiving recesses 25 each defined by a cylindrically curved surface 26 leading at its inner end to an intersection 24 and an annular, radially extending surface 28 joining the surface 26 at its radially outer extent and the surface 30 of the passageway 14 at its radially inner extent.

The valve 10 includes a pair of replaceable annular seats 32 each of which has a through passage 34 of a diameter substantially equal to that of the passageway 14. As best seen in FIGURE 1, each seat 32 is generally L-shaped in radial cross-section including a longitudinally extending portion defined between the passageway 34, an outer cylindrical surface 36 and a flat annular end surface 38 and a radially extending portion of greater diameter than the surface 36 having a generally flat annular end surface 40.

The seats 32 are preferably pressed into the recesses 25 so that the seat end surfaces 38 abut the recess surfaces 28, the seat cylindrically curved surfaces 36 abut the recess surfaces 26 and the two seat end surfaces 40 are disposed in generally parallel planes and are presented toward one another.

Figure 6:
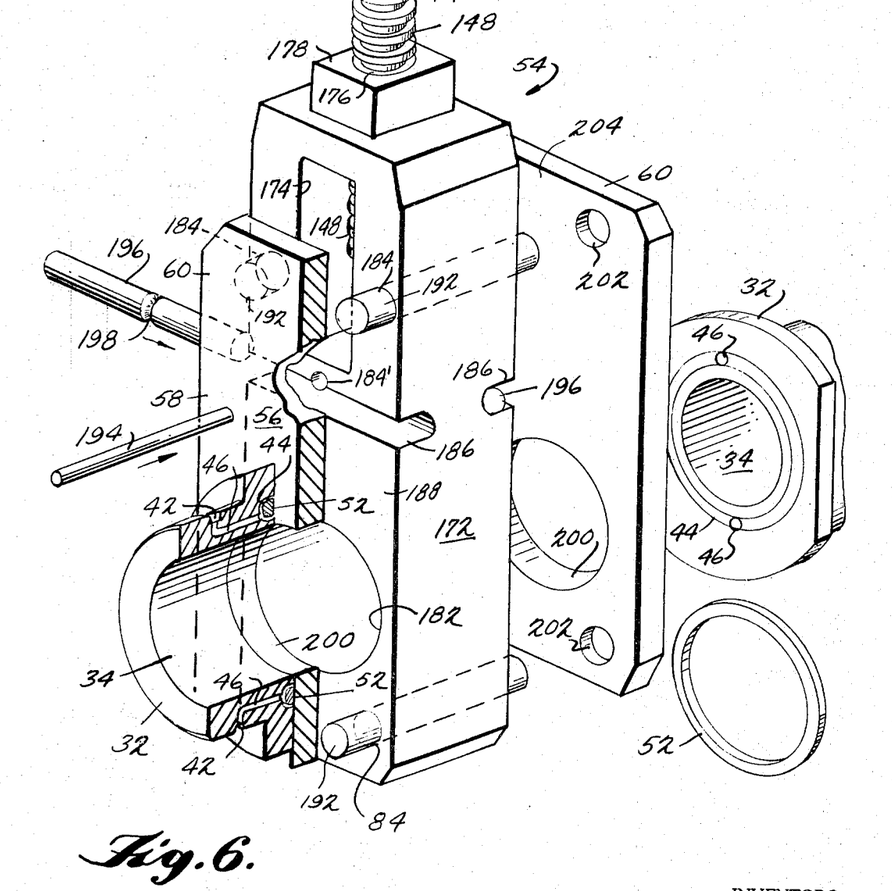
FIGURE 6 is an exploded perspective view of the gate assembly and valve seats of the FIGURE 1 valve.

Each seat 32 as shown best in FIGURES 1 and 6 includes a circumferential, radially outwardly opening groove 42 therein intermediate the ends of the surface 36 and an annular groove 44 in the surface 40 peripherally surrounding the passageway 34 intermediate the radially inner and radially outer extent of the surface 40. A plurality of conduits 46 are formed in each seat 32 to intercommunicate the grooves 42 and 44 of each seat 32. A pair of conduits 48 in the valve body communicate the grooves 42 with the exterior of the valve.

Suitable means such as threaded plugs 50 are received in the outer ends of the conduits 48 to provide closures for these conduits.

During assembly of the valve 10, a tight fitting resilient annular sealing ring 52 of polytetrafluoroethylene or the like is placed in each groove 44 and with the gate assembly 54, more fully described hereinafter, in the closed position thereof wherein the blind regions 56 of the surfaces 58 of the gate plates 60 are adjacent the surfaces 40 of the seats, viscous plastic sealing material 62 is forced under pressure into the conduits 48. The material 62 flows into the grooves 42, through the conduits 46 and into the grooves 44 behind the rings 52 forcing the latter into stressed engagement with the surfaces 58. Additionally the plastic sealing material forms a seal at the mouths of grooves 42, between the seats 32 and body 12.

Because the seats 32 are relieved at 35 by the absence of two opposed sector shaped portions of an otherwise annular shape, the seats 32 are easily removable and replaceable through the chamber 20 to be described.

Adjacent the upper extent of the body 12 the chamber 20 undergoes an enlargement and a transition from square horizontal cross-section to circular horizontal cross-section. The first radial enlargement at 64 is shown having a smaller diameter than the diagonal distance across the square portion of the chamber but a larger diameter than the width of a side of the square portion of the chamber so that it appears as four unconnected arcuate relieved cylindrically curved regions 66. The latter regions, at their upper extent intersect an annular upwardly facing shoulder 68 at its radially inner extent. The shoulder 68 at its radially outer extent joins a cylindrically curved upwardly extending surface 70 which at its upper extent merges with the lower extent of an upwardly outwardly flaring conically curved annular surface 72 which extends to the upper end of the body 12. The body upper end includes a flat annular horizontal surface 74 whose radially inner extent intersects the surface 72.

A plurality of circumferentially spaced vertically directed threaded sockets 76 are formed in the body 12 opening intermediate the radially inner and radially outer extent of the body and surface 74.

The bonnet 78 includes an inverted frusto-conical recess 80 defined by a downwardly and outwardly flaring annular surface 82 and a radially extending annular surface 84. A plurality of circumferentially spaced threaded openings 86 are formed through the bonnet in vertical alignment with the sockets 76. The bonnet 78 is shown secured to the body 12 by a plurality of bolts 88 threadably received in the openings 86 and sockets 76. A stressed seal is formed between the bonnet and body by the interposition of an annular sealing member 90 of elastically deflectable hard metal or the like which includes a pair of oppositely tapered, radially outer annular sealing surfaces 92 and 94 each of which decrease in radius toward the adjacent ends of the member 90 so that its greatest girth is at the midpoint of its longitudinal extent.

The surfaces 92 and 94, when the member is not stressed, i.e. prior to assembling the valve as shown, are each tapered at a slightly more acute angle with respect to the longitudinal axis of the member 90 than are the bonnet and body sealing surfaces 82 and 72 respectively. Accordingly, when the member 90 is interposed between the body and bonnet drawn axially toward one another until the flat annular surface 74 abuttingly engages the downwardly facing flat annular surface 96 of the bonnet 78, the member 90 opposed legs 98 and 100 elastically deflect until the member sealing surface 92 is in stiffly resilient stressed sealing engagement with the bonnet sealing surface 82 and the member sealing surface 94 is in stiffly resilient stressed sealing engagement with the body sealing surface 72. By reason of the incorporation of the stressed seal just described, the valve 10 is usable in environments where the valve will be subject to a wide range of temperatures and rapidly changing temperature.

The bonnet 78 has an axially directed opening 102 centrally thereof which is defined by a cylindrically curved surface 104, joined to the inner extent of an upwardly facing annular shoulder 106 having its radially outer extent at the base of a cylindrically curved surface 108. At its upper extent, the latter surface meets the inner extent of an upwardly facing annular shoulder 110 whose radially outer extent intersects the base of a generally cylindrically curved surface 112 which is threaded at 114 intermediate its upper and lower extent. Adjacent the upper end of the bonnet 78, a radially directed interiorly threaded opening 116 is formed therethrough which communicates with the opening 102.

The operator assembly of the valve 10 includes a stem 118 received in the opening 102 so that the lower region thereof projects into the chamber 20 and the upper region thereof projects above the upper end 120 of the bonnet 78. Intermediate its upper and lower ends the stem 118 has an annular, radially enlarged integral collar 122. The stem is shown sealingly supported and mounted for rotation with respect to the body and bonnet by means which includes conventional chevron packing 124 received surroundingly engaging the stem and in turn surrounded by and engaging the bonnet surface 108. The packing 124 is bottomed on the bonnet surface 106 and is expanded to the sealing condition shown in FIGURE 1 by a stem packing junk ring 126. Viscous plastic sealing material 127 can be introduced into the packing 124 through the ports 129. The junk ring can be brought to the position shown by tightening of the packing gland 128 which is exteriorly threaded at 130 complementarily with the bonnet threads 114 and engages the radially outer region of the flat annular upper surface 132 of the junk ring 126 with its lower flat annular surface 134. The gland exterior is enlarged intermediate the ends thereof to define a radially directed downwardly facing shoulder 136 which abuttingly engages the upper end of the bonnet 78 when the gland is fully tightened as shown. A set screw 138 threadably received in the opening 116 engages the exterior of the gland to reduce the possibility of unauthorized disassembly of the valve 10.

The gland 128 doubles in function as a bearing housing inasmuch as its central chamber 140 encloses upper and lower bearing assemblies 142 and 144 and the stem collar 122. The upper bearing upper race is shown engaged by the downwardly facing annular shoulder 146 of the bearing housing central chamber 140 and the upper bearing lower race engaging the upper surface of the stem collar 122.

The lower bearing upper race engages the lower surface of the collar 122 and the lower bearing lower race is supported on the radially inner region of the upper surface 132 of the junk ring 126.

The lower region of the stem 118 extending below the bonnet recess defining surface 84 is exteriorly threaded, for instance with left hand, modified square threads 148. The upper region of the stem 118 projects through a central opening 150 in the gland 128. This opening is defined by a cylindrical surface having a circumferential radially inwardly opening groove 152 therein which receives an O-ring seal 154 which rollingly engages the exterior of the stem 118 to keep foreign matter such as dirt and water from contacting the bearings 142 and 144. The stem 118 is shown tapered adjacent its upper extent for receiving a hand wheel 156 or similar operating means secured on the stem by a nut 158.

Figures 4, 5, 8:
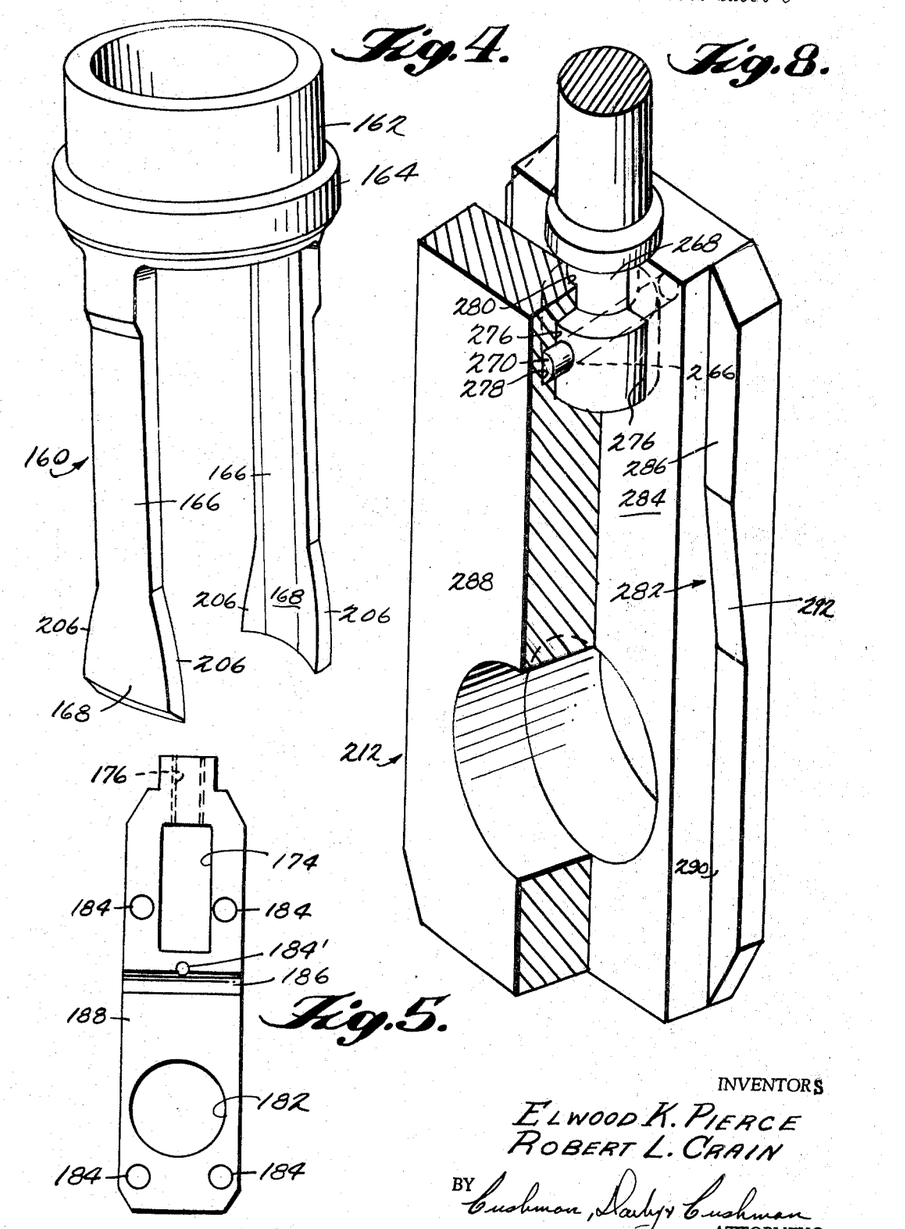
FIGURE 4 is a perspective view of the gate plate expander of the FIGURE 1 valve.
FIGURE 5 is a front elevation view of the gate plate carrier of the FIGURE 1 valve.
FIGURE 8 is an exploded perspective view of the gate assembly and valve seats of the FIGURE 7 valve.

A gate expander 160 shown in perspective in FIGURE 4 is loosely received in the body chamber 20. The expander 160 includes a generally tubular upper portion 162 having a radially outwardly extending collar 164 integrally formed thereon intermediate the upper and lower extent thereof. Above the collar 164, the expander tubular portion 162 is circumscribed by the seal 90. Below the collar 164, the expander tubular portion 162 is circumscribed at four circumferentially spaced arcuate regions by the surface 66 of the body chamber 20.

The expander 160 is free to move vertically between the lower position shown, where the lower surface of the collar 164 rests on the shoulder 68 and an upper position wherein the upper surface of the collar 164 abuts the axially lower end of the sealing ring 90.

Figures 3, 10:
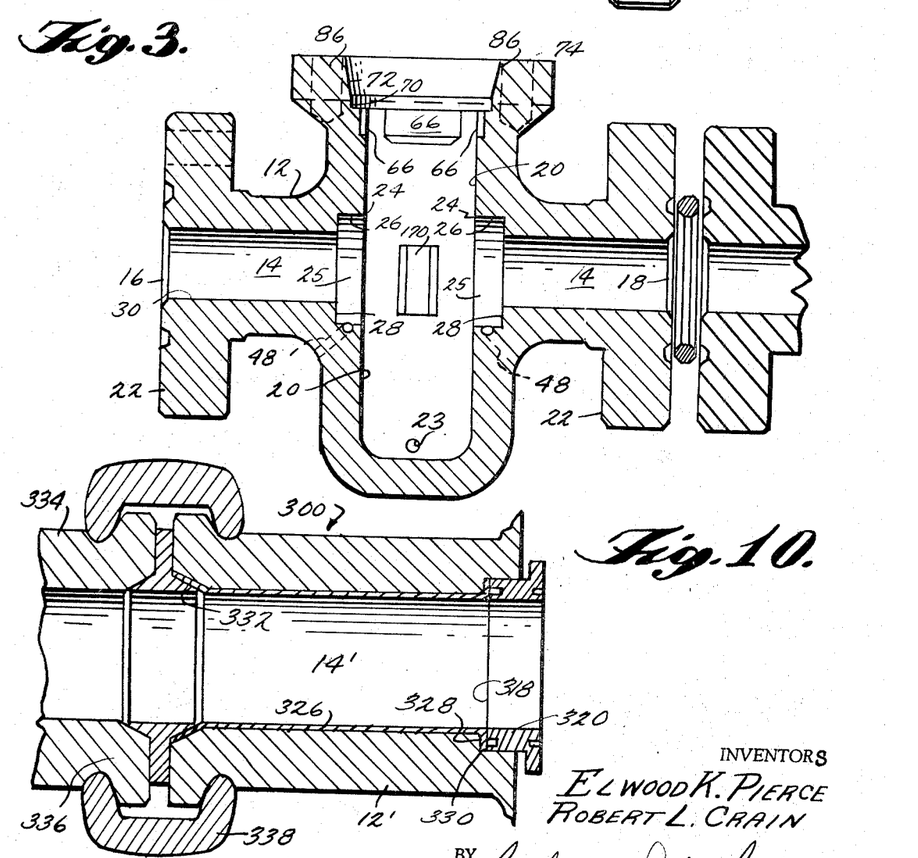
FIGURE 3 is a sectional view along line 3—3 of FIGURE 2.
FIGURE 10 is a fragmentary vertical longitudinal sectional view of a modified valve similar to that shown in FIGURE 9 but having an anti-corrosion liner sleeve and sealing ring means for expanding the outer end of the liner into place.

From the lower extent of the expander tubular portion 162 at diametrically opposed points thereon a pair of longitudinally elongated legs 166 integrally depend to a point approximately even with the lower extent of the passageway 14. The legs 166 are shown being arcuate in horizontal cross-sectional shape and each smoothly enlarged adjacent its lower extent in wedge-like fashion at 168. The wedges 168 of the expander are wider at their base and diminish in width upwardly thereof. The expander legs 166 and wedges 168 are restrained against movement away from one another during operation of the valve, as will be described by a pair of complementarily arcuate spacers 170 integrally formed on two opposed walls of the chamber 20 as best seen in FIGURES 2 and 3.

The gate assembly 54 of the valve 10 includes a gate plate carrier 172 which is threadably received on the threaded region 148 of the stem 118 so that rotation of the stem raises and lowers the carrier 172. As best seen in FIGURES 5 and 6, the carrier 172 has a vertically elongated opening 174 formed therethrough in the upper central region thereof. A vertically directed passage 176 extending downwardly from the upper end 178 of the gate plate carrier is interiorly complementarily threaded at 180 with the stem 118 threads 148 so that in the upper position of the gate assembly 54, the stem threaded portion 158 extends downwardly through the passage 176 and into the opening 174. Accordingly, the surface area of threads 148 in contact with threads 180 is substantially constant for all positions of the gate so that the frictional force due to thread contact is relatively constant during raising and lowering.

The gate plate carrier 172 also includes a laterally directed cylindrical opening 182 therethrough positioned below the opening 174 and axially alignable with the body passageway 14 and seat passageways 34 in the opening position of the gate.

Four relatively small laterally directed openings 184 are formed through the carrier 172 arrayed in a generally rectangular pattern with two openings 184 positioned near the lower corners of the carrier 172 and one on each side of the vertically elongated opening 174 intermediate the upper and lower extent thereof. A fifth smaller opening 184' is formed laterally through the carrier 172 centrally thereof just below the vertically elongated opening 174. As best shown in FIGURES 1, 5 and 6, the gate plate carrier 172 is completed by a pair of horizontal, outwardly facing channels 186 formed in the opposite faces 188 and 190 of the carrier 172 so that they intersect the small opening 184' at their uppermost extent in their central regions. Stated in other terms, the longitudinal axes of the channels 186 are below that of the opening 184' and the latter arches above the upper extent of the channels 186.

As seen best in FIGURES 1 and 6, each of the openings 184 receives a pin 192, each of which protrudes beyond each face 188 and 190 of the carrier 172. A pin 194 is received in the opening 184' and protrudes beyond each face 188 and 190 of the carrier 172. A generally cylindrical gate plate expander roller 196 is received in each channel 186 for rolling movement therein as well as reciprocation toward and away from the mouth of the associated channel 186. The rollers 196 are each circumferentially grooved at their longitudinal midpoint with an annular radially outwardly facing grooves 198. Accordingly, when the pin 194 is in the opening 184' and the rollers 196 are positioned as shown, the pin 194 enters both grooves 198 and prevents the rollers 196 from becoming axially dislodged.

The gate plates 60 of the gate assembly 54 are generally rectangular and each have a lateral generally cylindrical opening 200 therethrough which corresponds in diameter and axial position during the open condition of the valve 10 to the through passageway 14 of the body 34 of the seats and opening 182 of the gate plate carrier 172. Four laterally directed sockets 202 are formed in each gate plate opening outwardly through the surface 204 of each gate plate. The sockets 202 correspond in position to the four openings 184 in the gate plate carrier 172. The gate plates are assembled to the carrier by placing the gate plates so that the protruding portions of the pins 192 are loosely received in the sockets 202 and the surfaces 204 of the gate plates are adjacent the surfaces 188 and 190 of the carrier 172.

The rollers 196 each engage both wedges 168 and a gate plate rear surface 204.

In operation, to close the valve by lowering the gate assembly to the position shown in FIGURE 1, the handwheel is rotated in a first direction rotating the stem and forcing the gate assembly downwardly, the rollers roll-ing against the cam surfaces 206 of the expander legs 166. When the gate assembly has been lowered to such a point that the rollers begin to contact the portion of the cam tracks 206 which are on the expander wedges 168, the rollers are thereby forced toward the mouths of their respective channels 186 thus forcing the gate plates 60 laterally away from one another so that the surfaces 58 of the gate plates are in sealing engagement with the valve seats 32 and the gate plate blind regions 56 fully block the valve throughbore.

Rotation of the handwheel in the opposite direction from that just described rotates the valve stem in the opposite direction and causes the gate assembly to rise. During the beginning of the upward travel of the gate assembly the expander 160 can move upwardly until the collar 164 upper surface abuts the lower end of the sealing ring 90 as before described. When the rollers 196 begin to move with respect to the cam track, pressure is removed from the gate plates. Since the wedging action just described in relation to closing of the valve does not occur during the opening of the valve, only the frictional drag of the gate plate surfaces 60 against the seats 32 during the opening of the valve is significant. Abutment of the top of the gate plate carrier with the bonnet surface 84 limits further upward movement of the gate assembly.

Figure 7:
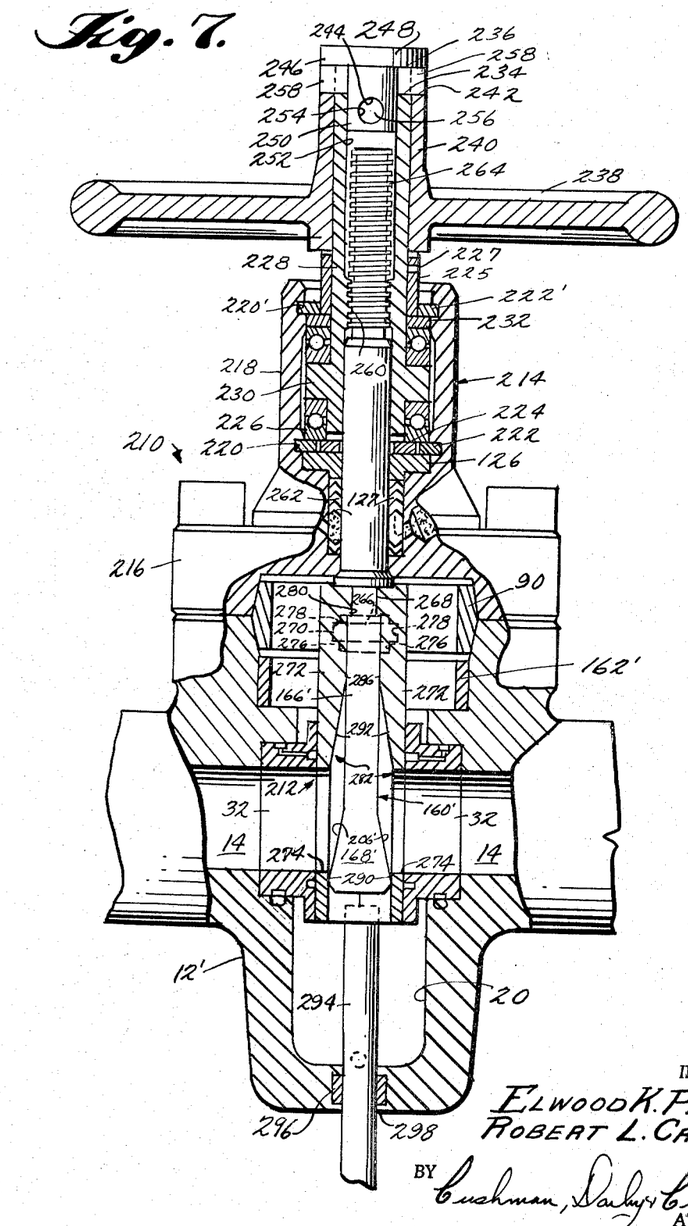
FIGURE 7 is a vertical longitudinal sectional view of a second embodiment of the invention.

The valve 210 shown in FIGURES 7 and 8 differs from the valve 10 of FIGURES 1–6 principally in the gate assembly 212 and operator 214 thereof; other elements being substantially similar to corresponding elements of the valve 10 are numeraled accordingly.

Above the junk ring 126, the bonnet 216 bearing housing 218 has a circumferential groove 220 which receives a split stem packing and bearing retainer ring 222, for instance comprising two arcuate portions and two sector shaped portions assemblable into an annulus. An annular spacer 224 is received radially inwardly of the ring 222 and the lower thrust bearing 226 is received on the ring and spacer 222 and 224. The bearing 226 supports a tubular stem drive bushing 228 via an integral, circumferentially extending radially outwardly directed annular collar 230. The upper thrust bearing engages the upper surface of the collar 230 and is retained in position as shown by an annular stem bearing washer 232 backed up by a second split stem packing and bearing retainer ring 222' received in a circumferential groove 220' in the bearing housing near the upper extent thereof. An axially elongated annular stem bearing safety retainer 225 is shown secured to the drive bushing by set screws 227 and engaging the upper surface of the stem bearing washer 232.

As shown best in FIGURE 7, the drive bushing 228 protrudes substantially above the housing 218 and has a diametric slot 234 adjacent its upper end 236 which opens outwardly of the end 236. A handwheel 238 is received on the upper end of the drive bushing 228, the handwheel hub 240 having a diametric slot 242 at its upper end corresponding to the slot 234. 90 degrees from slots 234 and 242 in a horizontal plane an opening 244 is formed through the handwheel hub and drive bushing. A stem drive 246 is employed to key the handwheel 238 to the drive bushing 228. The stem drive has an upper horizontal disk-like portion 248 whose lower surface abuts the upper ends of the hand wheel and drive bushing. An elongated cylindrical extention 250 depends from the disk 248 and is received within the drive bushing through passage 252. A lateral opening 254 in the extension 250 is alignable with the opening 244 and a pin 256 is received in the openings 244 and 254. Further strength is added to this connection by two diametrically opposed radially outwardly and axially downwardly directed fins 258 on the stem drive 246 which are received in the slots 234 and 242.

The stem drive bushing is internally threaded throughout an intermediate portion of its length, for instance with modified square threads 260. The rising stem 262 is complementarily exteriorly threaded near its upper extent at 264 and depends from the drive bushing into the gate receiving chamber 20'. Engagement of the lower, non-threaded region of the stem 262 by the chevron stem packing prevents contact of the threads 260 and 264 by the fluid to be controlled by the valve.

The stem 262 has a laterally directed opening 266 therethrough adjacent its lower end and a short distance above the opening 266 a circumferentially extending outwardly opening annular groove 268 is formed in the stem 262.

The opening 266 receives a press fitted pin 270 which protrudes from both sides of the opening 266. The gate of the valve 210 includes two gate plates 272, shown in perspective in FIGURE 8. Each of the gate plates 272 is generally rectangular and has a lateral opening 274 in its lower region corresponding to the valve body passage 14.

Near its upper extent each gate plate 272 has an arcuate groove 276 having a vertical longitudinal axis, centrally of each groove 276 a socket 278 is formed opening toward the mouth of the groove 276. A second arcuate groove 280 having a shorter radius of curvature than the groove 276 is located between the upper extent of the groove 276 and the upper end of each gate plate 272. In addition, each gate plate 272 has a generally vertically elongated cam track 282 at two transverse edges thereof. Both cam tracks 282 of each gate plate face the inner side 284 of the gate plate as it is shown mounted in FIGURE 7. As illustrated each cam track 282 comprises an upper planar segment 286, substantially parallel to the side 284 and spaced approximately one-third the distance therefrom toward the gate plate outer side 288. Each cam track 282 also comprises a lower planar segment 290 which is substantially parallel to the side 284 and spaced approximately two-thirds the distance therefrom toward the gate plate outer side 288. A ramp-like transitional segment 292 connects the lower end of the upper segment 286 and the upper end of the lower segment 290 of each cam track. The segments 292 have substantially complementary tapered angles as the wedges 168' of the expander 160'.

The gate plates 272 are assembled to the stem 262 by loosely fitting the projecting portions of the pin 270 into the sockets 278 and disposing the two gate plate grooves 280 complementarily circumferentially in the stem groove 268. Positioned as shown the cam tracks of each gate plate slidingly engage the cam surfaces 206' on one side of both expander legs 166'.

The rising stem of the valve 210 may be balanced by the securement of a tail piece 294 to the lower ends of the gate plates 272 which is slidingly received through circumferential packing 296 in an opening 298 in the body 12' at the lower central region thereof and protrudes from the valve through the opening 298.

Rotation of the handwheel of the valve 210 raises and lowers the valve stem by virtue of its threaded connection with the captive stem drive bushing. As the stem is lowered, the gate plates 272 are forced downwardly by it and their cam track surfaces slide along the expander leg camming surfaces. When the transitional surfaces 292 contact the wedges 168' the gate plates are forced into sealing engagement with the seat 32. As with the valve 10, the expander 160' is mounted for limited vertical movement upon initiating opening of the valve to relieve wedging action. The expander 160', the seats 32, operator assembly and gate assembly as well as the seal 90 and bonnet can all be removed from the valve while the valve remains connected in the conduit whose fluid it controls. Additionally, it should be recognized that the operating assembly and gates can be withdrawn and inserted as a unit from the valve body.

Figure 9:
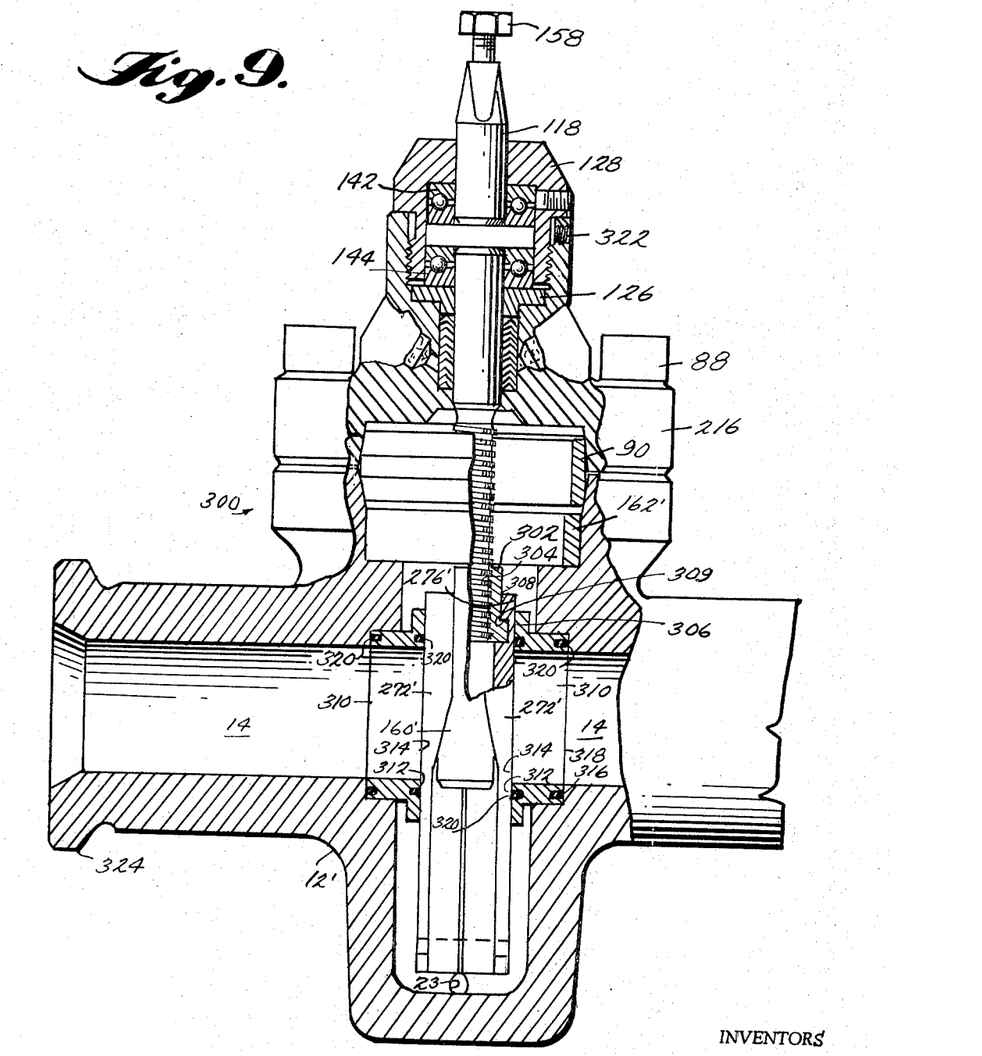
FIGURE 9 is a vertical longitudinal sectional view of a third embodiment of the invention.

The valve 300 shown in FIGURE 9 is a non-rising stem valve similar to that shown in FIGURES 1–6, but having the gate plates 272' and expander 160' of the valve 210 of FIGURES 7 and 8 and an adapter 302 for accommodating the gate plates to the valve stem. The adapter 302 is an internally threaded tubular member having modified square threads 304 for threaded engagement with the valve stem. Adjacent its lowermost extent, the adapter has an integral radially outwardly directed annular flange 306 which is received in the arcuate grooves 276' of the gate plates 272'. For ease of assembly one of the gate plates 272' may be fixedly secured to the adapter 302 as by welding at 308. Alternatively a pin and socket arrangement similar to that employed in the valve 210 could be used. A vertically elongated stem receiving half-socket 309 is shown formed in each gate plate 272' below the groove 276' therein. It extends downwardly to a point above the gate plate through passage.

The valve seats 310 of the valve 300 differ from the seats 32 of the valves 10 and 210 in the positioning and composition of the sealing members of the seats. Each seat 310 includes a circumferential annular groove 312 in its flat annular front face 314 and a circumferential annular groove 316 in its flat annular rear face 318. An annular insert 320 of polytetrafluoroethylene or the like is received in each groove 312 and 316 so as to protrude a slight amount, for instance 0.01 inch, beyond the adjacent seat face 314 or 318. The seal 320 in the front face 314 provides sealing between the seat 310 and a gate plate 372', the seal 320 in the rear face 318 provides sealing between the seat 310 and the valve body 12'. The annular inserts 320 are preferably secured in place by an adhesive bonding agent to prevent fluids or gases from being forced behind the inserts during operation of the valve. In other respects such as overall shape and removability, the seats 310 resemble the seats 32.

Further modifications present in the valve 300 include a port 322 for lubrication access to the stem bearings and clamp receiving flanges 324 rather than bolt receiving flanges on the body 12'.

Another modification of the valve 300 is shown in FIGURE 10 wherein a tubular anti-corrosion sleeve 326 of stainless steel or other corrosion resistant material is placed in the passageway 14' of the valve body 12'. The sleeve 326 is radially flared at its inner end 328 so as to fit in a groove 330 adjacent the rear face 318 of the seat 310, the flared end 328 being sealingly engaged by the annular insert 320. At its outer end, the sleeve 326 is flared at 332 to conform to the flaring of the valve passageway in the flange region. As shown in FIGURE 10, the valve 300 may be sealingly connected to a conduit 334 having a flared flange end 336 by the inclusion of a sealing ring of the annular elastic hard metal opposed deflectable lip type shown in the United States patents to Watts et al., Nos. 2,766,829, 2,766,998 and 2,766,999 and securement of the conduit flange to the valve body flange by a wedging clamp 338.

Preferably the liner 326 is inserted in the valve throughbore in a cylindrical tubular condition and the ends thereof are deformed to the condition shown after the liner is properly positioned.

Both halves of the valve body passageway may be lined in the manner just described. By providing such liners the body itself may be formed of less corrosion resistant material such as cast steel with a consequent saving in material and metal working costs.

From the above detailed discussion, it should now be apparent that the valves described efficiently accomplish all of the objects of the invention as set forth at the outset of the specification and clearly illustrate the principles of the invention. Because the embodiments shown can be considerably modified without departing from these principles, the present invention should be understood as encompassing all such modifications as are within the spirit and scope of the following claims.

We claim:

1. A gate valve comprising: a body, said body having means defining a flow passageway therethrough, means defining a gate receiving chamber in said body intersecting said passageway intermediate the ends thereof and transverse to the longitudinal axis of said passageway; means defining two annular recesses in said body, each circumferentially surrounding a juncture of said passageway and said body; an annular valve seat received in each of said recesses; means defining an opening through said body into said chamber at one end of the chamber; a gate including a pair of opposed gate plates received in said chamber through said opening and spaced from one another in the direction of the longitudinal axis of said passageway; gate expander means including a pair of elongated legs depending into said chamber, one adjacent and between each of the opposed gate plates adjacent the lateral edges of each gate plate; means defining a downwardly widening wedge on each of said elongated legs adjacent the lower extent thereof; means defining a flow passageway through said gate; means for moving said gate transversely of the body flow passageway to selectively align the body and gate flow passageway in a first position of the gate and to close off the body flow passageway in a second position of the gate; means on said gate slidably engaging each of said legs, said last-mentioned means engaging said wedges as said gate is moved from said first position to said second position thereby forcing said gate plates away from one another and into sealing engagement with said seats.

2. A gate valve as set forth in claim 1 wherein said chamber includes means defining a peripheral recess therein above the intersection of said chamber and the body flow passageway, said gate expander means further including an annular sleeve, said elongated legs depending from diametrically opposed points on said annular sleeve and straddling said gate, said sleeve being mounted in said peripheral recess.

3. A gate valve as set forth in claim 2 wherein said peripheral recess is of greater vertical extent than said gate expander annular sleeve, the latter being disposed in the recss for limited vertical movement therein.

4. A gate valve as set forth in claim 2 further including stop means positioned above said annular sleeve adjacent said recess for limiting upward movement of said gate expander.

5. A gate valve as set forth in claim 4 further including a bonnet secured to said body adjacent said opening through said body into one end of said chamber, the means for moving said gate transversely of the body flow passageway being mounted on said bonnet and depending therethrough into said chamber; means defining a downwardly opening recess in said bonnet, the last-mentioned recess being defined in part by an annular downwardly and outwardly flaring frusto-conical sealing surface extending substantially to the lower end of the bonnet; means defining an annular, upwardly and outwardly flaring frusto-conical sealing surface on said body peripherally of the opening through said body into one end of said chamber, the last-mentioned sealing surface extending substantially to said body one end; an annular sealing ring interposed between said body and said bonnet, said sealing ring including a pair of oppositely axially directed elastically deflectable annular lips and means defining an exterior annular frusto-conically curved sealing surface on each of said lips, the sealing ring sealing surfaces tapering toward the adjacent ends of the sealing ring, one of said sealing ring sealing surfaces being in surface to surface sealing engagement with the frusto-conical sealing surface on said bonnet, the other of said sealing ring sealing surfaces being in surface to surface sealing engagement with the frusto-conical sealing surface on said body.

6. A gate valve as set forth in claim 5 wherein said sealing ring has a lower edge and said lower edge comprises the stop means for limiting upward movement of said gate expander.

7. A gate valve as set forth in claim 2 wherein the means for moving the gate transversely of the body flow passageway includes a valve stem depending into said chamber; the gate further including a gate plate carrier joined to said valve stem adjacent the lower end of the valve stem, said gate plates being positioned one on each side of the gate plate carrier and secured to the gate plate carrier at least one of said gate plates being loosely secured to the gate plate carrier.

8. A gate valve as set forth in claim 7 further comprising a means defining a socket in one of said gate plates said socket opening toward said gate plate carrier; said gate plate carrier including a radially extending enlargement extending toward said one gate plate, said socket being of greater diameter than said enlargement and said enlargement being received in said socket to loosely secured said one gate plate to said gate plate carrier.

9. A gate valve as set forth in claim 8 wherein the means on said gate slidably engaging each of said expander legs includes means defining at least one oblique camming surface on each gate plate, each camming surface facing said gate expander means; the camming surface on each gate plate facing downwardly and being angled downwardly and away from the other of said gate plates.

10. A gate valve as set forth in claim 9 wherein said gate plate camming surfaces are correspondingly angled with respect to said downwardly widening wedges.

11. A gate valve as set forth in claim 7 wherein both of said gate plates are loosely secured to said gate plate carrier by means of at least one radial enlargement on said gate plate carrier projecting toward said gate plates and means defining a socket in each of said gate plates opening toward said gate plate carrier, said radial enlargement being of smaller diameter than said sockets and said radial enlargement being received in said sockets.

12. A gate valve as set forth in claim 11 wherein the means on said gate slidably engaging each of said elongated legs includes roller means received between said gate plate carrier and each of said gate plates; said roller means engaging said gate expander elongated legs and also engaging said gate plates.

13. A gate valve as set forth in claim 12 wherein the roller means are supported in means defining outwardly opening channels in said gate plate carrier.

14. A gate valve as set forth in claim 1 wherein each annular valve seat includes means defining an annular radially directed axially inner end surface, means defining an axially extending outer peripheral surface and means defining an axially directed central passageway through the valve seat communicating at one end thereof through said valve seat axially inner end surface; means defining a first annular groove in each seat in said axially inner end surface thereof coaxial with said central passageway; means defining a second annular groove in each seat in said outer peripheral surface thereof coaxial with said central passageway; means defining at least one communicating duct in each seat extending between said first and second annular grooves; conduit means in said valve body communicating with the second annular groove of each valve seat and with the exterior of the valve, an annular sealing ring received in each of said first annular grooves; a pressurized plastic sealant received through said conduit means into the second annular groove of each valve seat, into said communicating ducts and into said first annular grooves behind said annular sealing rings, said sealant forming a seal at said second annular grooves between said valve seats and said valve body and urging said annular sealing rings toward said gate for greater sealing pressure thereagainst.

15. A gate valve as set forth in claim 1 wherein each annular valve seat includes means defining an annular radially directed axially inner end surface; means defining an annular radially directed axially outer end surface and means defining an axially directed central passageway through the valve seat communicating at one end thereof through said valve seat axially inner end surface and at the other end thereof through said valve seat axially outer end surface, means defining a first annular groove in each seat in said axially inner end surface thereof coaxial with said central passageway; means defining a second annular groove in each seat in said axially outer end surface thereof coaxial with said central passageway; a first annular sealing ring received in said first annular groove and projecting axially beyond said axially inner end surface, said first annular sealing ring being adapted to seal between the valve seat on which it is received and said gate; a second annular sealing ring received in said second annular groove and projecting axially beyond said axially outer end surface, said second annular sealing ring sealing between the valve seat on which it is received and said valve body.

16. A gate valve as set forth in claim 1 wherein said flow passageway of said body is lined with an anticorrosive material, having materially greater anti-corrosive properties than the remainder of said body.

17. A gate valve as set forth in claim 16 wherein the body is essentially composed of cast steel and said lining is essentially composed of stainless steel.

18. A gate valve as set forth in claim 17 wherein said flow passageway of said liner is flared outwardly adjacent and leading to at least one outer end thereof and further includes means defining a peripheral enlargement therein axially spaced from said end, said lining comprising a tube having one end region thereof complementarily flared with said flow passageway one outer end, and having a second region thereof deformed radially outwardly into said peripheral enlargement.

References Cited

UNITED STATES PATENTS

| | | | |
|---|---|---|---|
| 321,807 | 7/1885 | Galvin | 251—199 |
| 340,371 | 4/1886 | Scott | 251—197 |
| 1,201,203 | 10/1916 | Langdon | 251—200 |
| 1,734,866 | 11/1929 | Law | 251—196 |
| 2,204,142 | 6/1940 | MacClatchie | 251—196 X |
| 2,479,124 | 8/1949 | Laurent | 251—196 X |
| 2,603,447 | 7/1952 | Olson | 251—196 |
| 2,895,709 | 7/1959 | Rattigan | 251—199 X |
| 3,044,742 | 7/1962 | Zelmann | 251—197 |
| 3,068,901 | 12/1962 | Anderson | 251—197 X |
| 3,125,323 | 3/1964 | Heinen | 251—197 |

CLARENCE R. GORDON, *Primary Examiner.*